3,246,991
PROCESS FOR MAKING A CHUNK STYLE PEANUT BUTTER
Fitzhugh L. Avera, Alameda, Calif., assignor to Corn Products Company, New York, N.Y., a corporation of Delaware
No Drawing. Filed Sept. 13, 1963, Ser. No. 308,678
7 Claims. (Cl. 99—128)

This application is a continuation-in-part of co-pending application Serial No. 94,590, filed March 9, 1961, now U.S. Patent 3,121,015, granted February 11, 1964, which is a continuation-in-part of application Serial No. 22,562, filed April 15, 1960, now abandoned.

The present invention relates to a new and novel method of making chunk style peanut butter. The invention, in general, comprises roasting chunks of raw peanuts in a slurry, of raw, comminuted peanuts, which has been roasted partially.

The so-called chunk style peanut butter presently comprises essentially a mixture or suspension of a small percentage of chopped or roughly ground pieces of roasted peanuts in smooth or finely ground roasted peanuts or peanut butter. Flavors and gravitational stabilizers may be added as desired. The product is referred to in the trade also as "chunky style" or "crunchy style" peanut butter. The chopped or roughly ground pieces of peanuts, which are generally of a predetermined size, will be referred to hereinafter as "chunks" of peanuts and the term "chunk style" peanut butter will be used to designate the product containing them.

As pointed out in application Ser. No. 94,590, now U.S. Patent 3,121,015, granted February 11, 1964, one of the problems in prior art processes of making peanut butter is the development of rancidity due to oxidation of the oil in the peanut butter. Another problem is the development of deleterious or obnoxious flavors concomitant to under-roasting and over-roasting in the development of an average roast flavor due to the moisture and thermal gradients within the whole or split peanut at the time of roasting. Another disadvantage of the prior art is the development of deleterious heat during comminution of the roasted peanuts. It is obvious that presently available chunk style peanut butters are subject to the same disadvantages, and in some respects to a greater degree, than the smooth style peanut butter. For example, the chunks, themselves, retain oil which is subject to oxidation, it being well known that roasted peanuts or unground pieces of peanuts are subject to earlier oxidative rancidity than peanut butted. Moreover, the deleterious effects of under-roasting or over-roasting are more apparent in the chunks than the finely ground peanuts because there is no opportunity for the balancing or off-setting of these defects against each other. Furthermore, the chunks lose their crispness upon storage and become less pleasing to the taste. For various reasons the chunk style peanut butter is more susceptible to the development of various defects than the smooth or finely ground type of peanut butter.

The main object of this invention is to provide an improved chunk style peanut butter and process for making the same. This improved chunk style peanut butter may or may not contain stabilizers to prevent oil separation. Another object is to provide a means of roasting chunks of raw peanuts whereby under-roasting and over-roasting are avoided. A further object is to provide an improved process for making chunk style peanut butter of enhanced resistance to oxidation, enhanced retention of crispness of the chunks of peanuts, and optimal flavor and palatibility. Other objects will appear hereinafter.

In my co-pending application Ser. No. 94,590, now U.S. Patent 3,121,015, granted February 11, 1964, there is described and claimed an improved process for making peanut butter wherein a slurry of raw, comminuted peanuts is roasted which is in direct contrast to present commercial methods wherein roasting always precedes grinding. In my improved process for making chunk style peanut butter, chunks of raw peanuts are mixed with or suspended in a fluid slurry, of raw comminuted peanuts, which preferably has been roasted partially. Roasting is then continued and during the time required to complete roasting of the slurry, the chunks also become roasted to the desired degree.

In carrying out my invention, I preferably follow certain preliminary procedures in order to produce an optimum product. First, any desired quantity of shelled raw peanuts is subjected to a drying operation of the type which will allow reduction of the water content and equilibration of the residual water content. These procedures are preferably carried to an extent that the peanuts have but a residual moisture content of approximately 1 to 2 percent, by weight, thereby affording the additional advantages of more effective blanching and more desirable plasticity during the roasting while in slurry phase. Thereafter, the peanuts are blanched in known manner to remove the red skin or peanut testa and, if desired, the peanut germs or nibs.

In preparing the partially roasted slurry of peanut butter, the raw or, if desired, incompletely roasted, blanched peanuts are thoroughly ground to provide a slurry of comminuted peanuts and exuded peanut oil having the consistency of peanut butter, i.e., the grinding is carried to the same extent as in prior art practices of grinding roasted peanuts. Thereafter, I subject the comminuted blanched peanuts to external roasting heat, or generate within the comminuted peanuts a temperature sufficient to partially roast the peanuts. Generally a temperature within the range of about 120 to 150° C. (248 to 302° F.) is satisfactory for the partial roasting of the slurry.

The chunks of raw peanuts which are added to the partially roasted slurry are prepared for example, by chopping or granulating the raw blanched peanuts previously described, preferably to a predetermined size, e.g., such as presently used in chunk style peanut butter. Chunks which will pass through a standard U.S. No. 4 mesh screen (4,760 microns) and be retained on a standard U.S. No. 6 mesh screen (3,360 microns) are satisfactory although other sizes may be used. These chunks, in the desired amount which is usually about 12 percent of the total weight of the chunk style peanut butter, are added to the partially roasted slurry, and the mixture of the two is subjected to further heat treatment to develop the desired degree of peanut flavor in the combined mass and to complete the roast of the same. The preferred temperature range for this latter step is 156 to 160° C. (314° to 320° F.) although a temperature range of about 149 to 176° C. (300° to 350° F.) may be used, depending upon the characteristics of the peanuts involved.

In one embodiment of the present invention, applicant has used successfully a simple method of placing the slurry made of comminuted, blanched peanuts made as described above, but wherein 16 percent of the liquid peanut oil was removed and replaced with partially hydrogenated peanut oils in a stirring jacketed kettle, the outside of which is surrounded by a heating medium such as chlorinated hydrocarbons or steam. The slurry is first heated with stirring, at a temperature at which it is partially roasted, e.g., 120 to 150° C. (248° to 300° F.), depending upon the moisture content of the raw chunks, and then the raw chunks of peanuts in the amount of about 12 percent are added. In one experiment in accordance with the principles of my invention, the temperature of the partially roasted slurry was 143° C. (290° F.) at the time the chunks having a moisture content of 2 percent by weight, were added. The resultant mixture is heated further with stirring, e.g., at 300–350° F. until the desired degree of roasting is attained. In an experiment where both slurry and chunks contained a moisture content of 2 percent by weight, the final roasting temperature was 317° F. Thereafter, the resultant chunk style peanut buttter is cooled, flavorings added, comprising salt and sugar, degassed, and packed.

In another embodiment of the present invention the peanuts used for the slurry had a different residual moisture content than those used for the chunks. For example, the slurry was made of comminuted, dried and blanched raw peanuts having a residual moisture content of 2 percent. The chunks of raw peanuts which were added to the slurry were made from raw, blanched peanuts having a residual moisture content of about 1 percent. The temperature used for partially roasting the slurry was 143° C. (290° F.) and the temperature for the final roasting step was 157.2° C. (315° F.).

It is also wtihin the scope of my invention to add chunks of raw peanuts having a residual moisture content in excess of about 2 percent, e.g., up to about 9 percent, to the partially roasted slurry and then roast the mixture.

As pointed out in co-pending application Ser. No. 94,590, now U.S. Patent 3,121,015, granted February 11, 1964, it is, of course, well known that for the introduction of roasting heat into or removal of same from the comminuted blanched peanuts there are many industrial heat exchangers known in the art for achieving heat exchange with viscous materials. In these heat exchangers the internal walls are continually scraped to provide maximum heat exchange. Any of these heat exchangers are entirely suitable for the partial roasting of the slurry of comminuted blanched peanuts and the final roasting of the mixture of the slurry and the chunks of peanuts, and the cooling thereof.

In the practice of this invention, the means for achieving the preliminary or partial, and final roasting heat are not limited to those disclosed herein. The partial roasting may take place at any time in the processing flow after grinding or it may be effected during grinding, or immediately after grinding. The final roasting may take place even after packaging in intermediate or final containers including the glass jars customarily used to contain peanut butter for distribution to the consumer.

Grinding of the raw blanched peanuts may be carried out in more than one stage and the heat developed during grinding may be used as a significant contribution to the energy requirement for partial roasting or the partial roasting step. For example, in one such embodiment of the invention, a temperature of 149° C. (300° F.) was obtained in the second of a two-stage grinding operation and the amount of heat to raise the temperature an additional 10° C. (50° F.) for the final roasting after the chunks were added was obtained by means of a heat exchanger.

I have found that it is advantageous in the manufacture of peanut butter to remove gases dissolved or entrained in the slurry of comminuted peanuts. For example, this may be done at any time, but, preferably, just subsequent to completing the roast, although degassing may be employed at any stage after the slurry phase is produced or at any or several stages prior to the final packing. Degassing equipment comprising a rotating drum and means for drawing a vacuum so as to take off vapors containing air or other gases is satisfactory. The rotating drum can be equipped with a blade or rotor for attenuating the slurry along the inner wall of a surrounding jacket, in the form of a thin film. Such film is subjected to relatively high vacuum to draw off from the attenuated film of the slurry any entrained or dissolved gases therein. Another method of degassing would be to operate the grinding equipment under vacuum to remove entrained gases.

I have found it desirable to continuously agitate or mix the slurry of comminuted peanuts during preliminary roasting, and after the chunks are added, in order to maintain uniform heat distribution throughout the product and obtain uniform roasting.

My invention is adaptable to batch or continuous processing, or a combination thereof and the system can be a closed system where exposure to atmosphere is avoided. It can be used with or without gravitational stabilizers, such as hydrogenated oil, which prevent or inhibit oil stratification.

Wherever the term "raw" is used herein in relation to peanuts such term shall be intended to include not only peanuts which have not been roasted, but also peanuts in every condition short of completely roasted.

It was surprising indeed to find that chunks of raw peanuts could be roasted to the desired degree in a partially roasted slurry of peanut butter and in a shorter time than the slurry phase. Furthermore, the chunks can be roasted uniformly, i.e., without any evidence of under-roasting or over-roasting and the deleterious effects concomitant thereto. It was unexpected to find that the partially roasted slurry could serve as such an excellent and uniform heating means for the chunks of raw peanuts. Equally unexpected was the discovery that the product possesses a full bodied roast flavor of enhanced intrinsic uniformity and such excellent keeping properties. Products stored over a period of 5 months showed no development of off-flavors or odors due to heat and oxidative deterioration and the chunks retained their original crispness.

As pointed out in co-pending application Ser. No. 94,590, now U.S. Patent 3,121,015, granted February 11, 1964, the peanut must be heated to develop roast flavors, but any subsequent heating or violent mechanical treatment after the roast flavors have been developed are generally recognized to be deleterious. Furthermore, it has been observed that films of peanut oil ostensibly free of solids are highly subject to oxidation. By avoiding the exposure of films of ostensibly solids-free exuded oil which come to the surface of a whole or split peanut during roasting, which act as precursors of rancidity, my improved process for making chunk style peanut butter overcomes this disadvantage. Post-roasting heat and post-roasting mechanical exposures of the type encountered in grinding and granulation or chopping after roasting in the prior art processes are eliminated. As far as I am aware, this is the first time in the history of the art that peanuts have been roasted after being ground to a slurry or raw peanuts chopped into chunks and roasted with a slurry for chunk style peanut butter. My improved process represents not only a radical departure from prior art processes but also produces an improved chunk style peanut butter.

I claim:

1. A process for making chunk style peanut butter comprising partially roasting raw peanuts comminuted to a peanut butter slurry, adding thereto chunks of raw peanuts and roasting the resultant mixture.

2. Process according to claim 1 wherein the slurry and mixture of chunks and slurry are agitated during roasting.

3. A process for making chunk style peanut butter comprising partially roasting comminuted raw and blanched peanuts, adding thereto chunks of raw and blanched peanuts, and roasting the resultant mixture.

4. Process according to claim 3 wherein the slurry and mixture of slurry and chunks are agitated during roasting.

5. A process for making chunk style peanut butter which comprises subjecting peanuts to a treatment to reduce and equilibrate the moisture content thereof, blanching the peanuts, comminuting a portion of the peanuts to a slurry, partially roasting the comminuted slurry, chopping another portion of the treated peanuts into chunks, adding the chunks to the partially roasted slurry, and roasting the resultant mixture.

6. Process according to claim 5 wherein the peanuts after said treatment contain not more than about 2 percent moisture, by weight.

7. Process according to claim 1 wherein a stabilizer which prevents gravitational oil stratification in the peanut butter is added.

References Cited by the Examiner
UNITED STATES PATENTS 3,056,682  10/1962  McOsker _____ 99—126
3,121,015  2/1964  Avera _____ 99—128

A. LOUIS MONACELL, *Primary Examiner.*

S. E. HEYMAN, *Assistant Examiner.*